(12) United States Patent
Olson

(10) Patent No.: US 11,423,803 B2
(45) Date of Patent: Aug. 23, 2022

(54) MATHEMATICS TEACHING AID AND SYSTEM FOR SLOPE

(71) Applicant: Eric Paul Olson, Newbury, MA (US)

(72) Inventor: Eric Paul Olson, Newbury, MA (US)

(*) Notice: Subject to any disclaimer, the term of this patent is extended or adjusted under 35 U.S.C. 154(b) by 53 days.

(21) Appl. No.: 16/587,035

(22) Filed: Sep. 29, 2019

(65) Prior Publication Data

US 2021/0097889 A1   Apr. 1, 2021

(51) Int. Cl.
  *G09B 23/04*  (2006.01)
  *G09B 1/00*   (2006.01)

(52) U.S. Cl.
  CPC .............. *G09B 23/04* (2013.01); *G09B 1/00* (2013.01)

(58) Field of Classification Search
  None
  See application file for complete search history.

(56) References Cited

U.S. PATENT DOCUMENTS

| | | | | |
|---|---|---|---|---|
| 1,541,179 A * | 6/1925 | Parkinson | G09B 23/04 434/215 |
| 1,912,380 A | 6/1933 | McCully | | |
| 2,822,618 A | 2/1958 | Wendel | | |
| 3,083,475 A | 4/1963 | Josephus | | |
| 5,113,590 A * | 5/1992 | Shapiro | B43L 7/10 116/320 |
| 5,588,218 A * | 12/1996 | Barry | G01B 3/563 33/1 N |
| 6,457,247 B1 * | 10/2002 | Lin | G01B 3/563 33/1 N |
| 7,942,675 B1 | 5/2011 | Errthum | | |
| 8,191,272 B1 * | 6/2012 | Light | G01B 3/563 33/471 |
| 8,206,155 B2 | 6/2012 | Gunasekaran | | |
| 2006/0174503 A1 * | 8/2006 | Johnson | B43L 13/002 33/471 |
| 2008/0078092 A1 * | 4/2008 | Lin | G09B 23/04 33/471 |
| 2008/0120852 A1 | 5/2008 | Ramsey | | |
| 2010/0316981 A1 | 12/2010 | Gunasekaran | | |
| 2012/0159797 A1 * | 6/2012 | Roth | B43L 13/002 33/424 |

* cited by examiner

*Primary Examiner* — Sunit Pandya

(57) ABSTRACT

A slope measurement and drawing aid (100) for teaching mathematics having unique indicia (130), rational-numeric slope values (184), and mathematical information (192), and a method of identifying the correct rational-numeric slope value associated with the graph of a given line, either by means of a gravity-activated indicator arm (140), or by means of the orientation of the teaching aid. For instructional purposes, when used in a classroom setting, the teaching aid can be removably held on a vertical board by magnetic (240R) or other means. When used in an individual setting, a smaller version of the teaching aid can similarly be used in a horizontal orientation on paper.

14 Claims, 4 Drawing Sheets

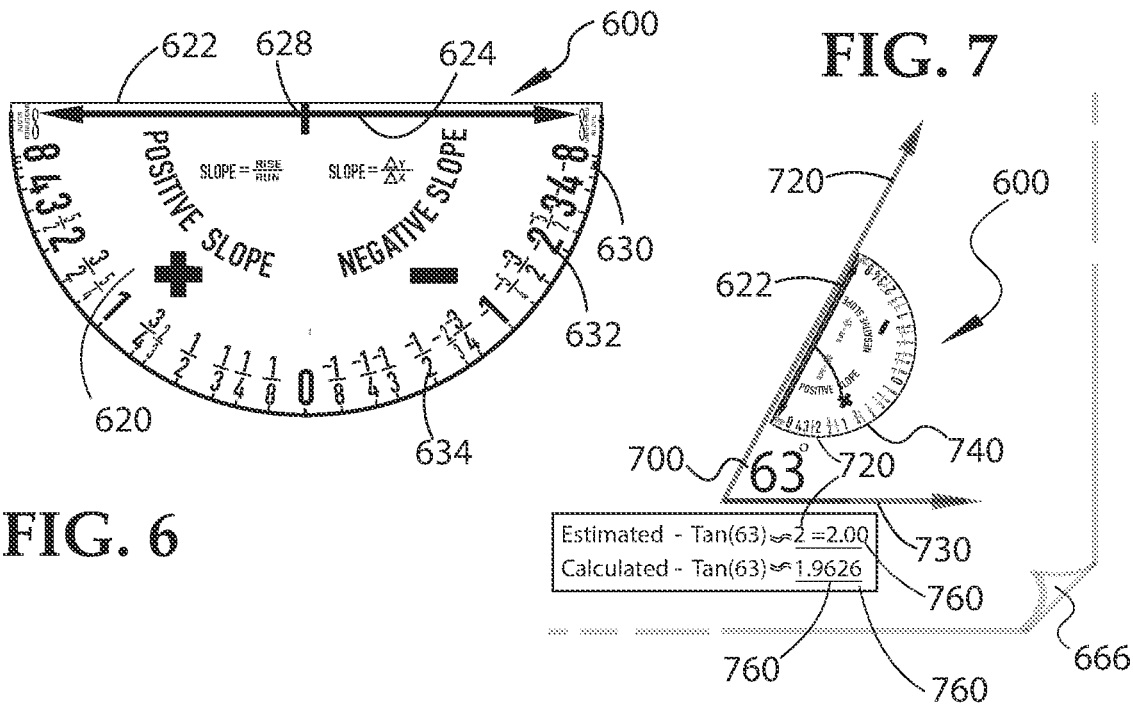
FIG. 6
FIG. 7
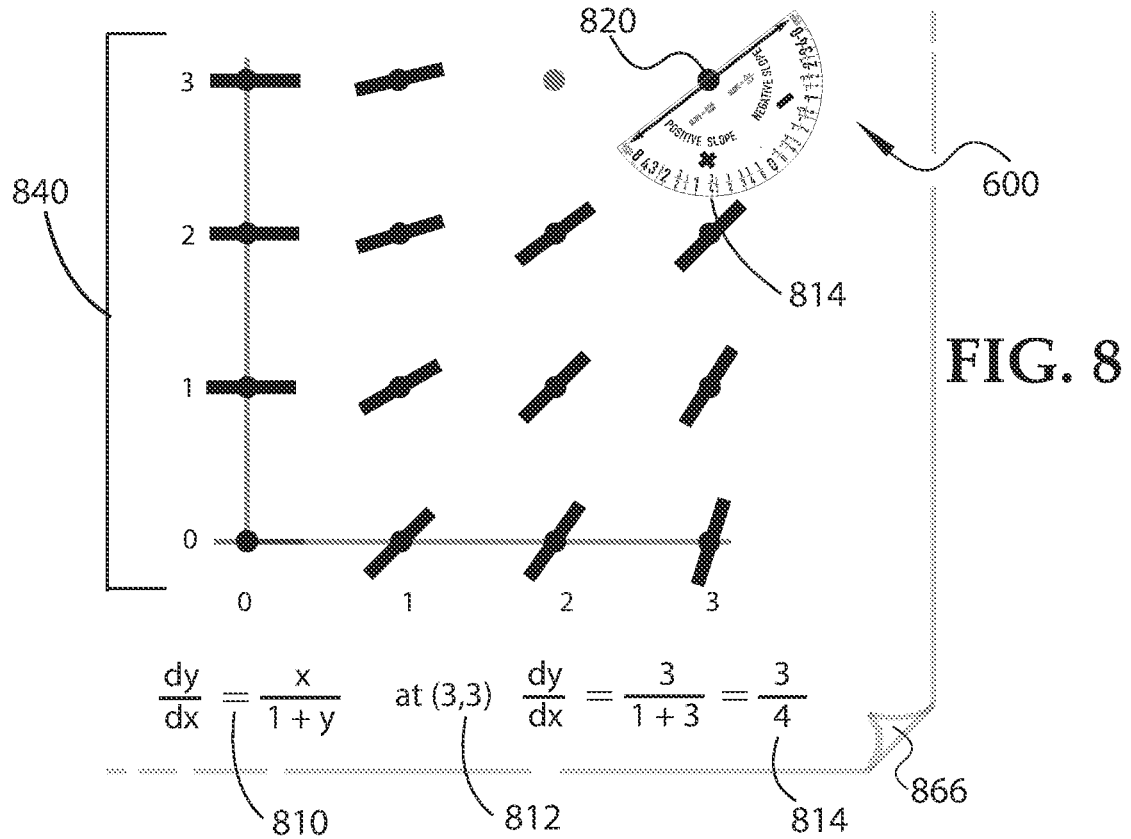
FIG. 8
$$\frac{dy}{dx} = \frac{x}{1+y} \quad \text{at } (3,3) \quad \frac{dy}{dx} = \frac{3}{1+3} = \frac{3}{4}$$

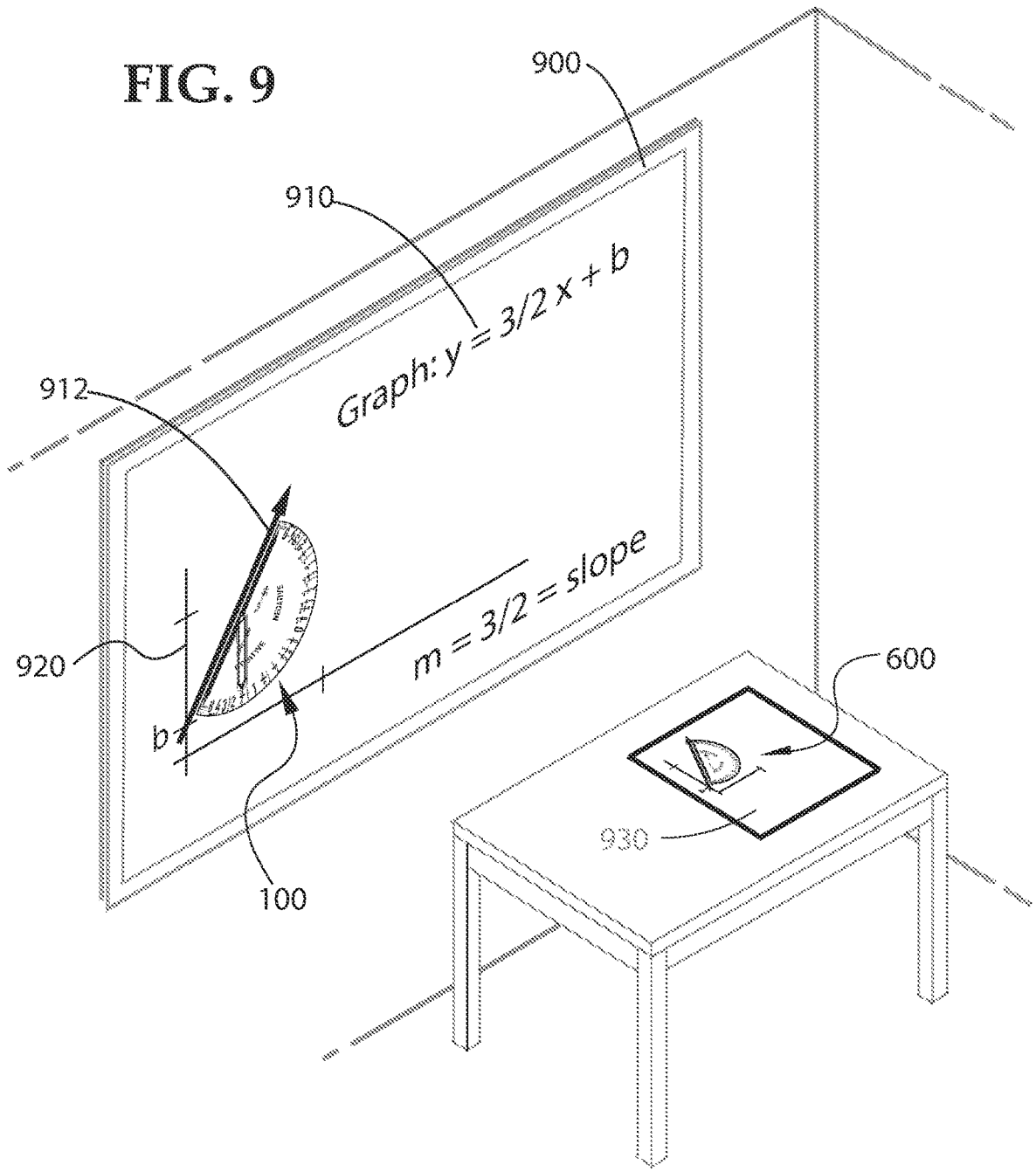

MATHEMATICS TEACHING AID AND SYSTEM FOR SLOPE

RELATED APPLICATION(S)

The present application claims the benefit of U.S. Provisional Patent Application No. 62/739,179, filed on Sep. 29, 2018 by the present inventor. The entire content of the above application is hereby incorporated by reference in its entirety.

BACKGROUND OF THE INVENTION

This invention relates generally to mathematics education, and specifically to the teaching and application of mathematics requiring slope measurement and drawing.

In mathematics, and mathematics education, the slope of a line is a fundamental concept. It is therefore widely taught and applied across all curricula—from late elementary school through the calculus of differential equations taught in advanced placement exams and universities. Mathematical slope when applied to most linear functions is almost exclusively a numeric ratio e.g. a simplified fraction, like $2/3$). Every beginning math student learning to graph a line on an x-y coordinate plane will learn the convention that mathematical slope is interpreted as the ratio of two quantities: the vertical change divided by the horizontal change between two points—commonly described as the "rise over run." Every algebra student is confronted with the challenge of understanding and utilizing the "slope-intercept" equation for a line also known as "y=mx+b" form, where the letter "m" stands for the numeric ratio above. Slope-values can be whole numbers, or decimals, but more typically are expressed as reduced fractions. Numerical slope values expressed as decimals are used, but typically only after an understanding of slope is achieved through their representation as numeric ratios of whole numbers (rational numbers) like $1/2$, $2/3$, or similar.

A deep understanding of the slope of a line is critical for early success in algebra. Often students struggle to understand what the number associated with slope actually means, or how it is determined. Students often have great difficulty identifying when a slope is positive or negative, and they confuse a slope of zero (a horizontal line), with an "undefined slope" or "infinite slope" (a vertical line), and students often invert the slope ratio and therefore divide the horizontal change by the vertical change. Students in elementary and middle school typically struggle when first encountering the mathematics of computing the slope of a line when employing the commonly used formula: $m=(y_1-y_2)/(x_1-x_2)$. It becomes a challenge to remember the formula, and even when used correctly provides an answer without concrete meaning. By observing the manipulation of the invention and how the numerical ratios change in real-time as the invention is moved in increasing or decreasing inclinations, learners more readily make sense of the numerical values corresponding to slope. Even students adept at algebra are often very poor at estimating the numerical value of a line's slope when presented with a graph. These difficulties persist up to and including the time when students begin to learn key concepts in differential calculus (in which a deeper and more reflexive understanding of the slope of a line is required). Students also struggle with related concepts like positive and negative correlation when working with graphs of data sets, or the simple fact that a tangent ratio can be greater than one, while the sine or cosine values cannot.

In calculus the "derivative" of a mathematical function is typically understood as the function's instantaneous rate of change at a given point, and is often represented graphically by a line drawn tangent to the function at that given point. (Note: in this case a true definition of "tangent" requires calculus but can be thought of as the line through two secant points as they become infinitely close to each other.) If the slopes of a series of lines tangent to various points on a graph of a function ($f(x)$) are plotted, a quick sketch of a derivative function ($f'(x)$) can be made. The display of the slope of the tangent line as the arrow-head on the indicator arm points downward greatly increases the ease and accuracy with which a sketch of the derivative function is made. An instructor using the teaching aid to demonstrate the process of sketching a derivative function has the advantage of an accompanying real-time visual display of the numerical slope value as it changes while tracing the teaching aid along the domain of the graph of the function. This constant reinforcement of the conceptual information being given by a calculus teacher is useful to students learning the process that is often called "curve-sketching."

Few teaching aids exist for calculus, and of these fewer still that try to address instantaneous rates of change or curve-sketching—and none that use gravity to give a slope-value for a function. There are numerous gravity-activated inclination-measuring devices elsewhere in the prior art, on the market, and in the literature. Clinometer, inclinometer, inclinograph, pitch-indicator, are all terms used to name devices that measure the angle, grade, or slope of a surface, building material, line, or line of sight. Typically these devices are used outdoors, some are used for construction purposes, and consist of a protractor-like semicircle with angle measurements, a plumb bob, pivot arm, or spirit level that is oriented along a straight line, or line of sight, to give a reading of inclination in an angular form thanks to the force of gravity acting on the appropriate feature. The angle measurement is then used to determine a distance, cut line, or height of an object, often by the use of trigonometric ratios. A few of these prior art devices are used to draw lines for cutting purposes on a construction site, or to layout lines for locating building components. Nearly all use angle measurement, and none are for mathematical purposes where measuring or drawing slope as a rational number is needed.

There are many angle-measuring devices that are used in outdoor educational settings, particularly for teaching trigonometry. They are simple, accurate, and easy to use but give only an angle measurement. Other devices exist which give limited measurement to non-angular forms of inclination: the pitch of a roof which is a 1-12 whole-number scale, or the percent grade of a road or plumbing pipes, or similar. These are almost exclusively designed to be used on a construction site in an outdoor environment, and are not teaching tools.

Still further, none of these devices are used in an indoor educational setting for mathematics instruction when simple rational-numerical slope ratios are needed to describe the inclination of a line or mathematical function drawn on a board, neither can any of the prior art be used as a drawing aid for the accurate layout of lines with a calculated rational-numeric slope.

It is therefore desirable that some teaching aid exist that can be used to facilitate the understanding of these and many other mathematical applications that require the use of rational-numeric slope values.

SUMMARY OF THE INVENTION

The present teaching aid achieves the goal of being able to aid in both measuring the rational-numeric slope value of a given line and to draw a line with when given some predetermined rational-numeric slope value. By virtue of the highly visual way in which the slope values are indicated, and can be seen to change as the teaching aid takes a variety of positions, students of mathematician quickly gain a more direct understanding of the nature of slope—and related mathematical concepts. Both as a memory-aid, to assist students in visualizing and understanding the slope relationship, and as a way to apply mathematical slope, the teaching aid solves the problems outlined in the background discussion.

According to an exemplary embodiment, a mathematics teaching aid and and system is provided. The tool comprises a flat transparent semi-circular base of suitable size to be seen in a typical classroom with rational-numeric slope values and corresponding indicia radially arranged along the semi-circular perimeter at approximately even intervals and printed thereon. The semi-circular base has a reference line printed along the straight edge corresponding approximately to the diameter of the semicircle with a pivot point located at the center of the semicircle on the diameter. A gravity-activated indicator arm slightly less than the measure of the radius of the semicircle is secured to the pivot point on the straight edge in a manner that enables it to swing freely and thus point downward when placed against a vertical surface and allowed to find equilibrium. In this manner the indicator arm functions like a plumb bob to accurately point to the nearest corresponding rational numeric slope-value when the straight edge of the base is aligned with a graphed linear function, or the imagined tangent of a curvilinear function thereof. Additionally, the base is printed with information containing, but not limited to, the mathematical definition of slope, the colloquial catch-phrase for remembering the definition of slope as "rise/run" or similar, or through word or symbol to indicate whether a slope is "positive" or "negative" or without slope (also known as infinite or vertical slope).

Additionally, the exemplary embodiment can be removably secured to a vertical teaching surface by means of magnets or suction cups or hook-and-loop fasteners, or other similar means, thereby allowing a user to have free hands.

According to another exemplary embodiment, a mathematics teaching aid and and system is provided. The aid comprises a flat, transparent, semi-circular base, approximately the size and thickness of a standard credit card. It is similar in nearly every aspect to the previous embodiment, with all the rational slope-values, indicia, and additional information as the classroom version, but is of a size that an individual student can use at a desk in conjunction with a textbook or worksheet. The embodiment can still be used to estimate the approximate values of slopes or the slopes of imagined tangent lines without a gravity-activated indicator when the previous embodiment has become familiar to a student. The orientation of the invention on the page and the rational-numeric slope value that is at the lowest point on the semicircular base (closest to the bottom of the page) will indicate the best estimate of the slope of a line. Conversely, if the slope is known, that value can be oriented towards the lower edge of the page and the appropriate slope then drawn using the straight edge of the aid.

Thus the current invention will allow the user to more quickly, more accurately, and with greater fundamental understanding measure a line with a known slope—or draw a line with a calculated slope.

While the invention has been described in conjunction with general and specific embodiments thereof, it is evident that many alternatives, modifications, and variations will be apparent to those skilled in the art in light of the foregoing descriptions. For example, the device could have a variety of different numeric slope-values, including decimal numerical slope values. Therefore, it will be understood that the appended claims are intended to cover all such modifications and embodiments which come within the spirit and scope of the present invention.

BRIEF DESCRIPTION OF THE DRAWINGS

FIG. 6 is a front view of a second embodiment of an exemplary mathematical slope teaching aid according to the present invention.

FIG. 7 is an illustration of the first exemplary application of the teaching aid according to the present invention as shown in FIG. 6.

FIG. 8 is an illustration of the second exemplary application of the teaching aid according to the present invention as shown in FIG. 6.

FIG. 9 is a perspective illustration of the first and second embodiments of the teaching aid according to the present invention as shown in FIG. 1 and FIG. 6 being used together to conduct the first exemplary application in FIG. 3

DETAILED DESCRIPTION OF THE INVENTION

For reasons explained below, and unlike known teaching aids, the teaching aid 100 may be capably used by a teacher or student, among others, to quickly measure the rational-numeric slope value of a graphed line; to estimate the slope of an imagined tangent line to a curvilinear graphed function as found in any calculus class; facilitate the rapid sketching of a derivative function $f'(x)$ based on the graphed function $f(x)$; facilitate the sketching of the second derivative function $f''(x)$ based on a sketch of a first derivative function $f'(x)$; to aid in quickly and consistently sketching a "slope-field" for certain solutions to differential equations; to estimate the tangent trigonometric ratio of a right triangle; to quickly and accurately estimate a linear regression line for a data set; in use by a practitioner trained in the field, the mathematics teaching aid may be rather universally used in a variety of applications to accomplish a wide variety slope-related measurements and drawings.

Figure 1:
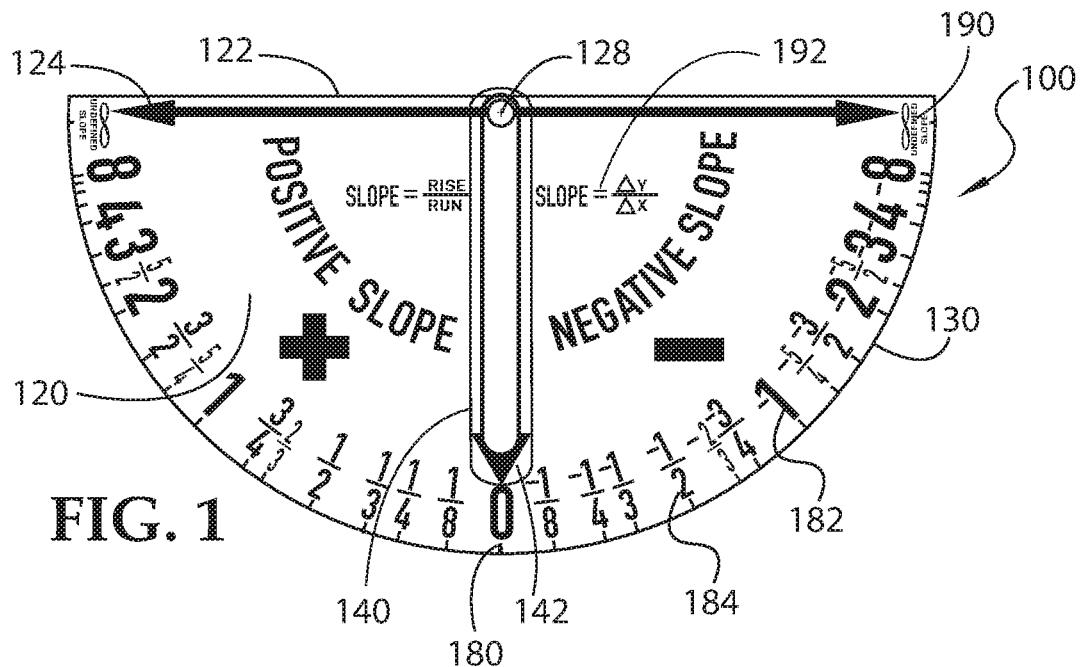
FIG. 1 is a front view of a first embodiment of an exemplary mathematical slope teaching aid according to the present invention.

FIG. 1 is a front view of an exemplary mathematical slope teaching aid 100 which may be used by teachers, students, and mathematicians, among others, to more accurately determine the numerical or slope value (typically expressed as a reduced rational number) of a line. The teaching aid may be used to measure the slope of a linear function, or estimate the slope of a perceived tangent line to a graphed curvilinear function, as well as permit the accurate drawing of a calculated slope for a line or a tangent line. The teaching aid is typically be used, but not limited to, written or projected mathematical material on a whiteboard or blackboard.

Figure 2:
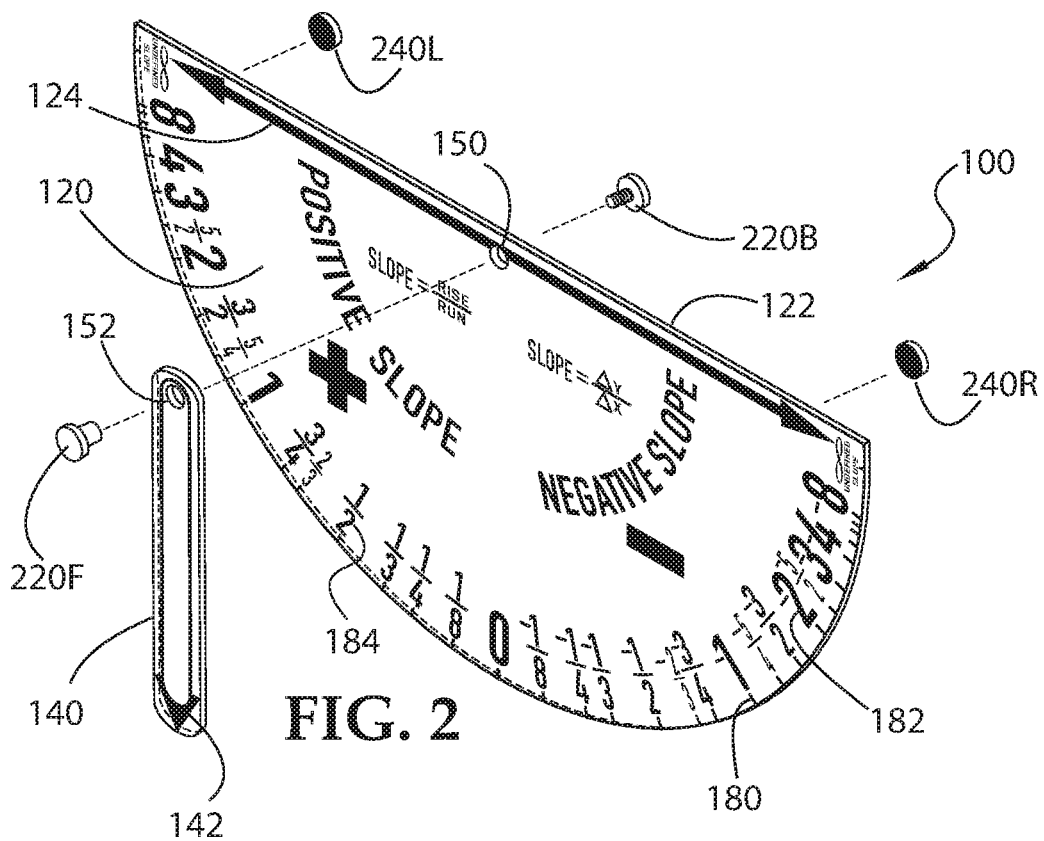
FIG. 2 is an exploded view of the teaching aid according to the present invention as shown in FIG. 1.

As illustrated in the front view in FIG. 1, and the exploded view in FIG. 2 an embodiment of the invention 100 consists of a generally flat and planar semicircular base 120 large enough to be seen from any desk in a typical classroom. A clearly visible line 124 is imprinted along the straight edge 122 of the base 120. The base 120 has indicia 180 numerical values 182 and fractional values 184 radially disposed equidistantly from the center of the pivot point reference mark 128 that defines the semicircular perimeter of the base 130. The pivot point reference mark 128 will be the location of the hole 130. The teaching aid should be made of some suitable lightweight transparent material (e.g., acrylic plastic), an elongated indicator arm 140 (slightly shorter in length than the radius of the semicircular base 120) made of similar transparent generally flat and planar material with an index line or arrow-head 142 centrally disposed along the major axis. The indicator arm 140 has a suitable hole 152 in the proximal end to match a similar hole 150 located at the pivot point reference mark 128 on the base 120. Suitable fasteners 220A and 220B (e.g. a sleeve-nut and bolt) that movably secure the indicator arm to the front of the base and allow it to swing freely around its pivot-point 128 centrally located near the straight edge 122 of the semicircle defined by the radially disposed rational-numeric slope values 184. Rotational movement of the indicator arm 140 may typically be achieved by means of fasteners 220F and 220B that are a slightly smaller diameter than the holes provided in the base 130 and indicator arm 132. By advantage of the free movement of the planar indicator arm, when vertical, the indicator arm will find equilibrium under the force of gravity and point downward, as would a plumb bob, and clearly identify which of the radially imprinted rational-numeric slope values 180 corresponds to the inclination of the straight portion of the semicircular when aligned with a suitable mathematical graph. The invention also has some number of magnets 240L and 240R, mounted on the back surface of the base to sufficiently and temporarily secure the device 100 to a vertical board surface while in use for demonstration purposes. Also imprinted on the face of the semicircle 120 is additional slope-related mathematical information 190 useful to anyone using the teaching aid, such as, but not limited to the definition of slope as "rise/run" or (y1−y2)/(x1−x2); written and/or graphic indicators for when a slope is positive or negative; written and/or graphic indicators for when a slope is said equivalently to be "infinite," "undefined" or have "no slope"; or any other useful indicia or information 192 that relates to the mathematics of slope.

Figure 3:
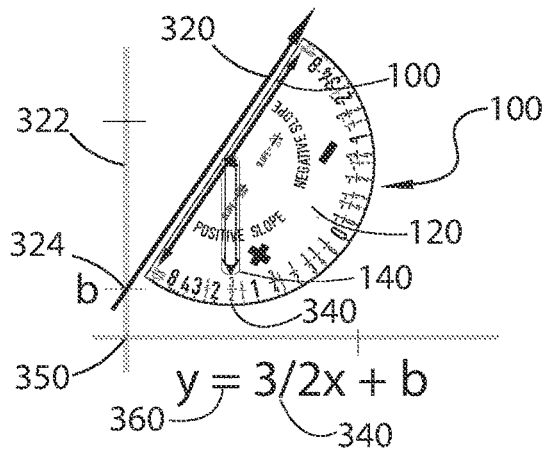
FIG. 3 is an illustration of the first exemplary application of the teaching aid according to the present invention as shown in FIG. 1.

FIG. 3 shows an exemplary use of the teaching aid 100. When a function is graphed on an x-y graphing axes 350 (as it might be drawn or projected on a vertical display board such as a dry-erase board), the teaching aid 100 can be used to measure the rational-numeric slope value of the function when the straight edge 122 of the teaching aid 100 is aligned with the graph 320 of a typical linear function 360 with a given slope 340 and a given y-intercept (b) 324 on the y-axis. The rational-numeric slope value 340 can be read by the indicator arm 140. Conversely, the teaching aid 100 can be used to draw the graph of a line intersecting the y-axis 322 at a known y-intercept (b) 324 with known slope 340 typically when given in slope-intercept form (e.g. y=3/2x+5). The person using the teaching aid 100 places one end the straight edge 122 of the semicircular face 120 on point (b) 324 and then manipulates the teaching aid 100 until the desired slope 340 is indicated by the gravity-activated indicator arm 140. A line may then be drawn accurately and without the need for a second point to be plotted. (Note: for most elementary applications, the teaching aid will be used when the x-y graphing axes 350 are at the same scale. For more advanced applications, a simple conversion factor can be multiplied by the slope value to give accurate results.)

Figure 4:
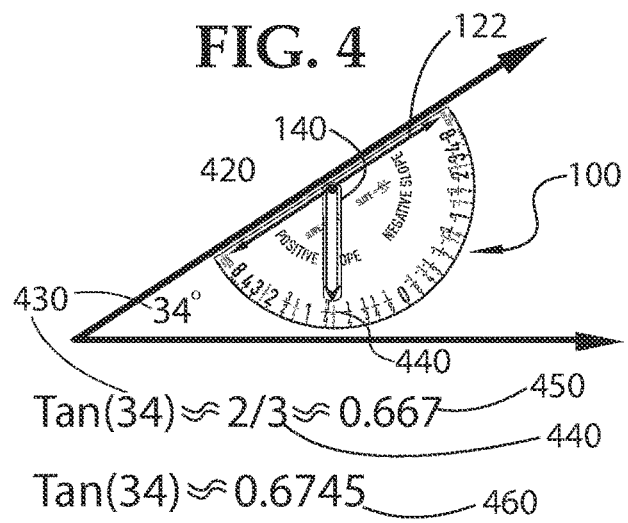
FIG. 4 is an illustration of the second exemplary application of the teaching aid according to the present invention as shown in FIG. 1.

FIG. 4 shows an exemplary use of the teaching aid 100 being aligned along the straight edge 122 with the upper ray 420 of an exemplary acute angle 430 such that the indicated slope-value 440 is identified by the indicator arm 140. The decimal value 450 of the slope 440 can easily be divided out by hand and thereby return a tangent value 450 within a small error bounds of a calculated decimal tangent value 460 for the given angle measure 430.

Figure 5:
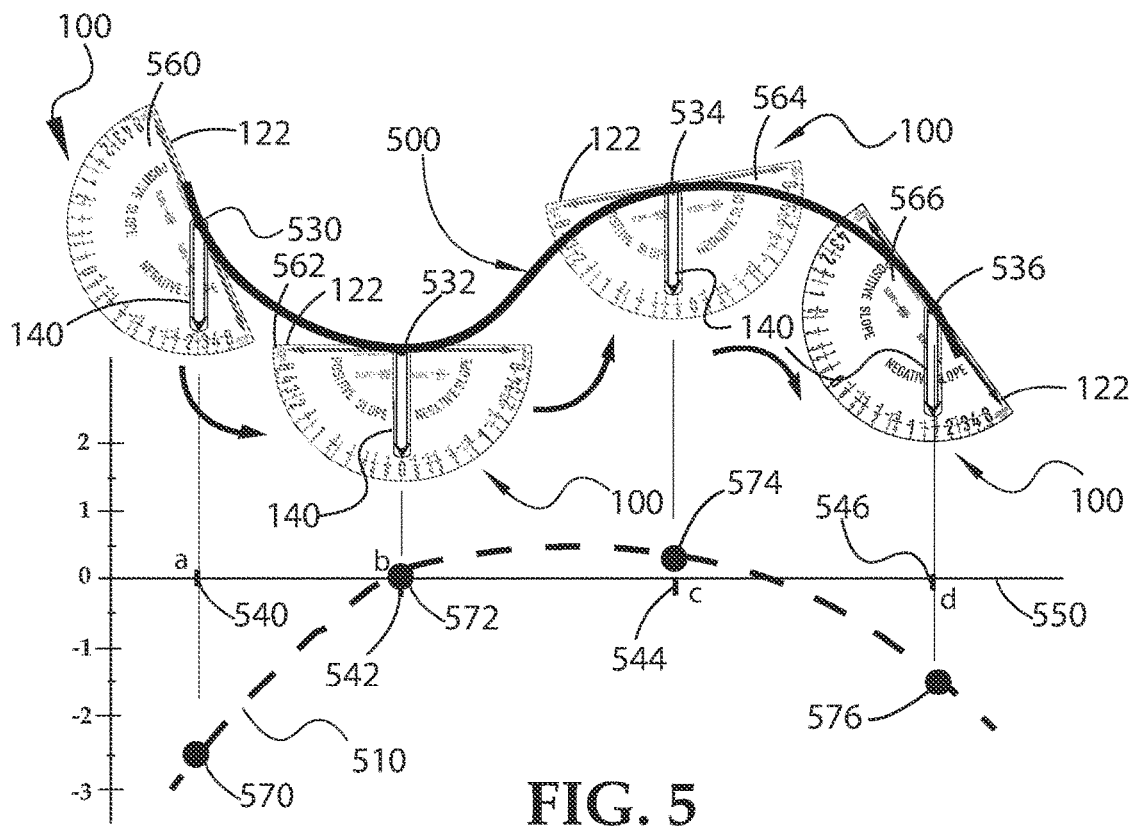
FIG. 5 is an illustration of the third exemplary application of the teaching aid according to the present invention as shown in FIG. 1.

FIG. 5 shows an exemplary use of the teaching aid 100 to sketch a representation of the derivative function $f'(x)$ 510 that corresponds to a graph of an exemplary function $f(x)$ 500. Typically, the function $f'(x)$ 510 is plotted or otherwise placed on a board with an x-y axes 520. The teaching aid can be placed at any desired point along $f(x)$ 500 but is typically started on the left end of the graph and moved slowly along to the right tracing the outline of the graph of the function $f(x)$ 500 while the straight edge remains tangent and the slope values are noted. In this exemplary illustration of the left to right movement, four such positions are shown corresponding to four x-values, and are therefore marked on the x-axis 550 at: (a) 540, (b) 542, (c) 544, and (d) 546, as they are generated by the reading of the indicatory arm 140 at each position. At each point along the function $f(x)$ 500 the teaching aid is placed in such a way that the straight edge 122 aligns with an imagined tangent line to the function $f(x)$ 500 at that point, and the indicator arm 140 then gives the reading of the slope corresponding to the estimated tangent line at that point—thus representing its instantaneous rate of change, or derivative value. At the position corresponding to point (a) 560 a negative slope value returned by the indicator arm 140 is plotted for $f'(a)$ 570. At the position corresponding to point (b) 562 a slope value near zero is returne plotted for $f'(b)$ 572. At the position corresponding to point (c) 564 a small positive slope value is plotted for $f'(c)$ 574. At the position corresponding to point (d) 566 a negative slope value is plotted for $f'(d)$ 576. Using this method, the slope-values of a series of points (as many as desired) can be determined for the given function $f(x)$ 500, the corresponding derivative values can then be plotted on the same, or another, coordinate graphing x-y axes 550 and the approximate derivative function $f'(x)$ 510 can be rapidly and accurately sketched. Subsequently, the process can be continued, but is not shown in any figure, whereby the sketched derivative function $f'(x)$ 510 would be used to find a second derivative $f''(x)$, as is often done in calculus (e.g. when representing a graph of acceleration when given the displacement of an object).

FIG. 6 is a front view of an exemplary mathematical slope teaching aid 600 which is designed to be used primarily by students, and mathematicians, among others, as in similar fashion to the first embodiments in FIG. 1, only on a personal scale. Typically the mathematical slope teaching aid 600 would be used in conjunction with mathematical slope teaching aid 100 in a classroom setting, or when a student was completing practice exercises on paper. The mathematical slope teaching aid 600 has no moving parts, but by advantage of the orientation of the semicircular base, the slope value can be closely estimated without the need of a gravity-activated indicator arm, particularly when the practitioner is familiar with the use of teaching aid 100. The teaching aid 600 may be used to measure or facilitate the drawing of a multiplicity of mathematical representations, including but not limited to, those exemplary embodiments for teaching aid 100 above. The teaching aid 600 is typically be used with, but not limited to, written mathematical material in a textbook or worksheet.

The mathematical slope teaching aid 600 consists of a generally flat and planar semicircular base 620 small enough to be used on a personal scale in a typical math textbook or worksheet, and made of some suitable lightweight transparent material. The semicircular base 620 is imprinted with a clearly visible line 624 that containing a pivot point reference mark 628 located at the center of the semicircle and near the straight edge 622. The semicircular base 620 has indicia 630, numerical values 632, and fractional values 634 radially disposed along the semicircular perimeter of the base to clearly indicate which of the radially imprinted rational numeric slope values correspond to the inclination of the straight edge 622 of the semicircular base when aligned with a suitable mathematical graph. Also imprinted on the face of the semicircle 620 is additional slope-related mathematical information useful to anyone using the teaching aid, such as, but not limited to the definition of slope as "rise/run" or $(y1-y2)/(x1-x2)$; written and/or graphic indicators for when a slope is positive or negative; written and/or graphic indicators for when a slope is "infinite" or has "no slope"; or any other useful indicia that relates to the mathematics of slope.

FIG. 7 shows an exemplary use of the teaching aid 600 to estimate the tangent of an exemplary angle 700 printed on a worksheet 666. To estimate the value of the tangent, the straight edge 622 of the teaching aid 600 is aligned with the upper ray 720 of the given angle 700, such that the rational-numeric slope value 740 can be identified being the closest value to the lower ray 730 of the given angle 700. The approximately equivalent decimal value of the identified rational-numeric slope value 740 can be found easily by dividing out by hand, if necessary, and return an estimated tangent value 750. This can be compared to a calculated decimal value 760 for the given angle 700.

FIG. 8 shows an exemplary use of the teaching aid 600 to draw the calculated slope value for a differential equation's "slope field" 840 as given on a pre-printed page 866 of an exercise book. The given differential equation 810 is used to calculate the slope 814 at a given point 812, which is then sketched onto the given lattice point 820 provided by orienting the teaching aid so that the desired value 814 is nearest the lower edge of the worksheet 866.

FIG. 9 shows an exemplary use of teaching aid 100 used in conjunction with teaching aid 600 to draw the graph of a simple linear equation 910. A board 900 contains the given equation 910 the graphed line 912, and the axes 920 while a student working at a desk is able to follow the steps being modeled by the teacher. By magnetic means the teaching aid 100 is secured to the board 900 and the teacher is free to circulate in the classroom and monitor student learning. Students use teaching aid 600 to complete the exercise pre-printed on a worksheet 930.

The teaching aids 100, 600 can be economically made in a number of processes, such as cutting, stamping, molding, or machining. The teaching aid could be made of any suitable transparent material, and may be produced in a variety of sizes, with varying scale measurements and indicia. It can be made with a variety of means for allowing the gravity activated indicator arm to pivot as well as for removably securing teaching aid to a board. The placement of any means for securing the teaching aid to a board is widely flexible, and need only allow the teaching aid's easy placement and removal, and is not to be understood to be specific in location or number.

While the invention has been described in terms of various specific embodiments, those skilled in the art will recognize that the invention can be practiced with modifications within the spirit and scope of the claims.

RELEVANT PRIOR ART INCLUDES

U.S. Pat. No. 1,541,179 June, 1925 Parkinson
U.S. Pat. No. 1,912,380 June, 1933 McCully
U.S. Pat. No. 2,822,618 February 1958 Wendel
U.S. Pat. No. 3,083,475 April, 1963 Lepoudre
U.S. Pat. No. 1,912,380 June, 1933 McCully
U.S. Pat. No. 0,078,092 April, 2008 Lin
U.S. Patent Publication 0120852 May, 2008 Ramsey
U.S. Pat. No. 7,942,675 May, 2011 Errthum
U.S. Pat. No. 0,316,981 December, 2010 Gunasekaran

What I claim is:

1. A mathematics teaching aid system comprising:
   a generally flat and planar base, said planar base having a front side and a back side with at least one straight edge;
   at least one pivot point reference mark substantially centrally located on said straight edge;
   a first coordinate line indicia parallel to the straight edge and intersecting the at least one pivot point; and
   a plurality of slope values indicated as a simplified numeric ratio of positive or negative whole numbers and corresponding indicia visibly displayed in predetermined positions equidistant from said pivot point reference mark on said planar base and radially disposed relative to said pivot point reference mark, each of said slope values and corresponding indicia disposed in predetermined positions corresponding to said predetermined slope values with respect to said straight edge, and ranging between values of zero and positive infinity in a positive direction and between zero and negative infinity in a negative direction, wherein the indicia of slope value of zero is positioned along a second coordinate line that is perpendicular to the first coordinate line indicia and intersects the pivot point reference mark and wherein the indicia of slope values of the positive infinity and the negative infinity are positioned along opposite ends of the first coordinate line indicia.

2. The mathematics teaching aid system of claim 1 further comprising mathematical information related to the understanding of slope or use of said mathematics teaching aid and system visibly displayed on said planar base.

3. The mathematics teaching aid system of claim 2 wherein said mathematical information comprises, but is not limited to, the symbol for infinity, any shorthand definitions for slope, any precise mathematical definition of slope, any positive or negative signs located to reinforce the concept of slope.

4. The mathematics teaching aid system of claim 1 wherein said planar base is made of suitable transparent material.

5. The mathematics teaching aid system of claim 1 wherein said planar base is of suitable size to be visible in a classroom, and substantially semicircular; whereby the radius of said semicircular base is defined by said equidistant placement of said indicia or said slope values.

6. The mathematics teaching aid system of claim 1 further comprising an attachment means for removably securing said teaching aid to a vertical presentation board.

7. The mathematics teaching aid system of claim 1 further comprising an elongated generally flat and planar indicator arm of a length sufficiently less than the radius of said semicircular base to be easily contained inside said equidistant placement of said slope values; with pivot means at said proximal end for rotationally movable attachment of said planar indicator arm to said front side of said planar base at said central reference mark.

8. The mathematics teaching aid system of claim 7 further comprising a pivot means located substantially at said pivot point reference mark on said front of said planar base for said rotationally movable attachment of said indicator arm.

9. The mathematics teaching aid system of claim 7 wherein the attachment of said indicator arm to said front side of said planar base is by means of a fastener slightly smaller than the diameter of said holes through said planar indicator arm and said planar base to thereby allow said indicator arm free rotational movement under the effect of gravity when oriented correctly.

10. The mathematics teaching aid system of claim 1 wherein the planar base is of suitable size to be used by an individual on a standard educational worksheet.

11. The mathematics teaching aid system of claim 1 further comprising mathematical information related to the understanding of slope or to the use of said mathematics teaching aid and system visibly displayed on said planar base.

12. The mathematics teaching aid system of claim 11 wherein said mathematical information includes, but is not limited to, the symbol for infinity, at least one shorthand definition for slope, positive and negative signs.

13. The mathematics teaching aid system of claim 11 further comprising a visible line imprinted substantially on and parallel to said straight edge on said planar base.

14. The mathematics teaching aid system of claim 11 further comprising a method to identify approximate said radially disposed slope values by the orientation of said slope values directly nearest to a defined mathematical reference line.

\* \* \* \* \*